Figure 1:
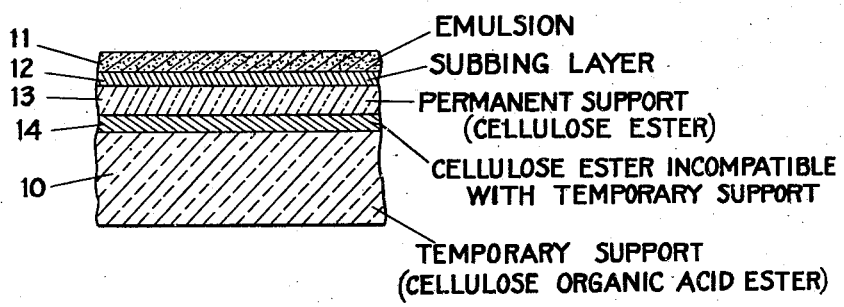

Dec. 16, 1941.   G. F. NADEAU ET AL   2,266,435
PHOTOGRAPHIC STRIPPING FILM.
Filed March 20, 1941

GALE F. NADEAU
CLEMENS B. STARCK
INVENTORS

BY
ATTORNEYS

Patented Dec. 16, 1941

2,266,435

UNITED STATES PATENT OFFICE 2,266,435

PHOTOGRAPHIC STRIPPING FILM

Gale F. Nadeau and Clemens B. Starck, Rochester, N. Y., assignors to Eastman Kodak Company, Rochester, N. Y., a corporation of New Jersey Application March 20, 1941, Serial No. 384,296

13 Claims. (Cl. 95—9)

This invention relates to a photographic film and more particularly to a photographic stripping film for use as a mask in producing color film duplicates.

The principle of the photographic stripping film is well known. It consists of a film in which the sensitive emulsion layer is carried on a temporary support from which it may be removed, together with a permanent support. After recording an image and developing it the permanent support carrying the image is removed from the temporary support and usually transferred to a third support. This transference is made possible by the use of a soluble adhesive layer which is used to join the temporary and permanent supports together. At the desired moment, under influence of some agent, such as a solution dissolving the adhesive layer, the supports are separated and the image is transferred.

The above type of film has numerous photographic applications, one of which is in the production of duplicates of color films. This process involves the production of a mask or photographic image in register with a multi-color transparency in order to apply the proper amount and quality of color correction, and then printing through this masked transparency onto another sensitive film as described in a prior Patent U. S. 2,203,652 granted June 4, 1940, to G. Ehrenfried. This method is subject to certain limitations, one of which is the difficulty with which the mask is placed in register with the original film and maintained in that position during exposure. Another difficulty lies in the fact that in order to print high quality duplicates by the masking method the masking image must be carried on a thin support or other support of optical clarity such that definition will not be adversely affected. Supports of the order of thickness required, approximately .0003–.0005 in. cannot be easily coated, therefore, it is necessary to employ a stripping film of the general type described above provided with an emulsion layer on a thin support which may be stripped from a temporary support and laminated onto the color film original.

The principal object of the present invention is to describe a stripping film for use in printing duplicates of color films, which avoids these difficulties. Another object is to provide a dry stripping film not having a soluble adhesive layer for joining the temporary and permanent supports for the emulsion. Another object is to describe the process of using the stripping film in printing duplicates of color film originals. Other objects will appear hereinafter.

These objects are accomplished in the present invention in part by a stripping film having a temporary support of a cellulose ester or paper, a cellulose ester permanent support carrying a light sensitive emulsion layer, and having between the temporary and permanent supports a layer of cellulose ester, or other material such as a cellulose ether, synthetic resin or wax, incompatible with the temporary support. Other objects are accomplished by applying this dry stripping film to a method of printing color film duplicates.

By "dry stripping film" we mean a film of the stripping type which does not depend for the stripping characteristics upon a soluble adhesive layer joining the permanent and temporary supports but which has a layer of cellulose ester or other material compatible with the permanent support and incompatible with the temporary support, such that the adhesion between this layer and the temporary support is sufficient to permit emulsion coating, slitting and other film handling operations and at the same time the adhesion is not so great that it prevents continuous and rapid stripping of the stripping layer from the temporary support. The layer uniting the permanent and temporary support may also be incompatible with the permanent support and compatible with the temporary support.

In the accompanying drawing in Fig. 1, is represented an enlarged sectional view of a stripping film having a temporary cellulose organic acid ester support, a cellulose ester permanent support carrying an emulsion layer, and between the two supports, a layer of cellulose ester incompatible with the temporary support.

Figure 2:
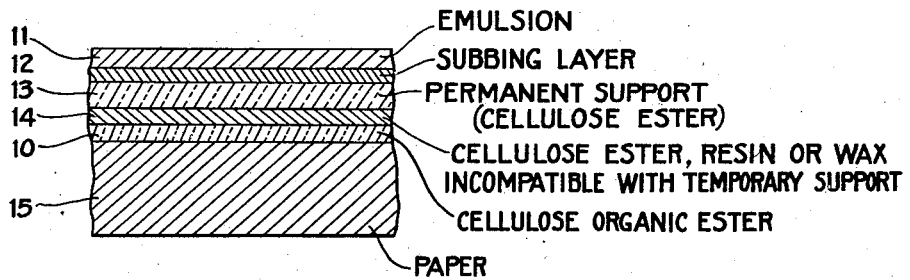

In the accompanying drawing Fig. 2 represents an enlarged sectional view of a stripping film having, as the temporary support, paper coated with a cellulose organic acid ester, a cellulose ester permanent support, and between the two supports, a layer of cellulose ester, resin or wax incompatible with the temporary support.

The method we use for making a stripping film useful in the reproduction of color films will now be described with particular reference to the accompanying drawing. As shown in the drawing in Fig. 1, a temporary support 10 consisting of a cellulose organic acid ester such as cellulose acetate, cellulose acetate propionate or cellulose acetate butyrate, is coated with a thin layer 14, consisting of a cellulose ester or ether, natural or synthetic resins or a wax incompatible with the temporary support. The composition of the temporary support is not critical but we prefer to use well-esterified esters of cellulose. The composition of the incompatible cellulose ester layer 14 is, however, more critical. For a cellulose acetate temporary support, 38–42% acetyl, we may use an extensively hydrolyzed cellulose acetate propionate, 15% propionyl and 20% acetyl, applied from the following solution:

| | Per cent |
|---|---|
| Cellulose acetate propionate | 2 |
| Ethylene dichloride | 10 |
| Methyl cellosolve | 25 |
| Acetone | 35 |
| Methanol | 28 |

The same formula may be used for other temporary supports such as cellulose acetate propionate, 16% propionyl and 30–32% acetyl or cellulose acetate butyrate, 31% acetyl and 20% butyryl. The degree of adhesion of the incompatible cellulose ester layer may be regulated by varying the precipitation value of the cellulose ester. "Precipitation value" as used herein refers to a test made to determine the degree to which a cellulose ester has been hydrolyzed as defined in Sulzer U. S. Patent No. 1,833,136 granted Nov. 24, 1931, in reference to cellulose acetate, and modified for testing other hydrolyzed cellulose esters such as cellulose acetate propionate, by varying the water content of the final acetone-water mixture. In testing cellulose acetate propionate or other hydrolyzed esters useful in our invention by this method the final acetone-water mixture may consist of 50 parts of water and 50 parts of acetone. We define "incompatible" as a property of a cellulose ester when coated over a layer of another cellulose ester, of forming on drying, a film which adheres sufficiently to permit emulsion coating, slitting and other handling operations and at the same time permitting rapid and continuous stripping when desired. The most satisfactory test of this property is to subject the film to actual conditions met in handling and determining whether the stripping layer adheres during handling and can be removed when desired.

In the Figure 1 of the accompanying drawing, after applying layer 14 of the incompatible ester, a thin layer 13 of a cellulose ester similar to but not necessarily identical in composition with that of layer 10 is applied to serve as the permanent support. A subbing layer 12 such as gelatin or a mixture of gelatin and a synthetic resin is then applied, followed by the emulsion layer 11. When a cellulose nitrate is used for the permanent support layer 13, it may be applied from a solvent mixture of the following composition:

| | Per cent |
|---|---|
| Cellulose nitrate | 8 |
| Butanol | 5 |
| Acetone | 25 |
| Methyl cellosolve | 15 |
| Methanol | 47 |

A cellulose acetate or mixed ester layer 13 may be used in place of cellulose nitrate in which case the following formula is suitable:

| | Per cent |
|---|---|
| Cellulose acetate or acetate propionate | 5–10 | in a solvent mixture consisting of

| | Per cent |
|---|---|
| Acetone | 70 |
| Methyl cellosolve | 15 |
| Methanol | 15 |

The subbing layer 12 adhesively joining the emulsion to the permanent support 13 may consist of the materials and be applied in the manner described in Nadeau U. S. 2,133,110 granted Oct. 11, 1938.

In the application of the invention to a photographic element having a paper support, as shown in Fig. 2, the temporary support consists of the paper layer 15 coated with the cellulose organic acid ester layer 10. Over this is coated layers 14, 13, 12 and 11 in the manner above shown in describing Fig. 1. Layer 14 consists of a cellulose ester or ether, a natural or synthetic resins or wax incompatible with the temporary support layer 10 hereinafter described as the "outer surface" of the temporary support. The fundamental difference between the element of Fig. 1 and that of Fig. 2 is in the temporary support layer. In the adaptation of the invention shown in Fig. 2 this layer consists of paper in addition to a cellulose organic acid ester.

The resins which we may use in layer 14 may be natural resins, such as shellac, copal, rosin and sandarak, or synthetic resins, as for instance, acrylates, Vinylites, etc. The wax we may use may be carnauba wax.

The stripping film of our invention may be used in printing duplicates of color films by laminating the stripping film layer to a color film original and after exposing, developing and fixing, then printing from this masked original onto a multilayer color film. In order to do this a film such as is shown in the drawing is stripped, the separation occurring between layer 14 and the temporary support. This thin layer carrying the emulsion then may be laminated to a color film, the support side next to the color film emulsion, by means of the following solution:

| | Per cent |
|---|---|
| Gelatin | 3–6 |
| Water | 80 |
| Glycerin | 15 | to which are added Turkey red oil in the proportion of 15% of the weight of the gelatin and glacial acetic acid to the extent of 10% of the weight of the gelatin. We then expose, develop and fix the sensitive emulsion in a manner such that a color-correction mask is produced in register with the image of the color film. From this masked original color film may be printed duplicates in color.

A sound track may be printed into the stripping film either before or after lamination to a color film. While it is possible to cement the two films together base to base, emulsion to base or emulsion to emulsion, when the sound track is printed into the stripping film layer we prefer the emulsion to emulsion union. The sound track may be in the same or a different stripping film layer than that carrying the masking image.

Our invention is capable of numerous variations, as has been mentioned, in respect to the composition of the temporary and permanent supports, and the subbing layer adhesively joining the emulsion to the permanent support. In addition, the cellulose ester of the incompatible layer of the invention may be composed of a cellulose acetate hydrolyzed to the extent that it contains approximately 30% acetyl, or the layer may consist of another cellulose mixed organic acid ester such as cellulose acetate butyrate, 20% acetyl and 18% butyryl.

It is to be understood that the disclosure herein is by way of example and that we consider as included in our invention all modifications and equivalents within the scope of the appended claims.

What we claim is:

1. A photographic stripping film comprising a temporary support having an outer surface of a cellulose organic acid ester, a cellulose ester permanent support carrying a light-sensitive emulsion layer, and between said layer of the temporary support and said permanent support a layer of a water-insoluble, colloidal material incompatible with the temporary support, said last-mentioned layer being strippable from said temporary support.

2. A photographic stripping film comprising a cellulose organic acid ester temporary support, a cellulose ester permanent support carrying a light sensitive emulsion layer, and between said layer of the temporary support and said permanent support a layer of a cellulose organic acid ester incompatible with the temporary support, said last-mentioned layer being strippable from said temporary support.

3. A photographic stripping film comprising a cellulose acetate temporary support, a cellulose ester permanent support carrying a light sensitive emulsion layer, and between said layer of the temporary support and said permanent support a layer of a cellulose organic acid ester incompatible with the temporary support, said last-mentioned layer being strippable from said temporary support.

4. A photographic stripping film comprising a cellulose acetate temporary support, a cellulose acetate propionate permanent support carrying a light sensitive emulsion layer, and between said layer of the temporary support and said permanent support a layer of a cellulose organic acid ester material incompatible with the temporary support, said last-mentioned layer being strippable from said temporary support.

5. A photographic stripping film comprising a cellulose acetate temporary support, a cellulose acetate propionate permanent support carrying a light sensitive emulsion layer, and between said layer of the temporary support and said permanent support a layer of cellulose acetate propionate incompatible with the temporary support, said last-mentioned layer being strippable from said temporary support.

6. A photographic stripping film comprising a paper support having an outer surface of a cellulose organic acid ester, a cellulose ester permanent support carrying a light sensitive emulsion layer, and between said layer of the temporary support and said permanent support a layer of a cellulose organic acid ester incompatible with the temporary support, said last-mentioned layer being strippable from said temporary support.

7. A photographic stripping film comprising a paper support having an outer surface of cellulose acetate propionate, a cellulose ester permanent support carrying a light sensitive emulsion layer, and between said layer of the temporary support and said permanent support a layer of a cellulose organic acid ester incompatible with the temporary support, said last-mentioned layer being strippable from said temporary support.

8. A photographic stripping film comprising a paper support having an outer surface of cellulose acetate propionate, a cellulose acetate propionate permanent support carrying a light sensitive emulsion layer, and between said layer of the temporary support and said permanent support a layer of a cellulose organic acid ester incompatible with the temporary support, said last-mentioned layer being strippable from said temporary support.

9. A photographic stripping film comprising a paper support having an outer surface of cellulose acetate propionate, a cellulose acetate propionate permanent support carrying a light sensitive emulsion layer, and between said layer of the temporary support and said permanent support a layer of cellulose acetate incompatible with the temporary support, said last-mentioned layer being strippable from said temporary support.

10. A photographic stripping film comprising a cellulose organic acid ester temporary support, a cellulose ester permanent support carrying a light sensitive emulsion layer, and between said layer of the temporary support and said permanent support a layer of a cellulose ether incompatible with the temporary support, said last-mentioned layer being strippable from said temporary support.

11. A photographic stripping film comprising a cellulose acetate temporary support, a cellulose ester permanent support carrying a light sensitive emulsion layer, and between said layer of the temporary support and said permanent support a layer of a cellulose ether incompatible with the temporary support, said last-mentioned layer being strippable from said temporary support.

12. A photographic stripping film comprising a cellulose acetate temporary support, a cellulose acetate propionate permanent support carrying a light sensitive emulsion layer, and between said layer of the temporary support and said permanent support a layer of a cellulose ether incompatible with the temporary support, said last-mentioned layer being strippable from said temporary support.

13. A photographic stripping film comprising a cellulose acetate temporary support, a cellulose acetate propionate permanent support carrying a light sensitive emulsion layer, and between said layer of the temporary support and said permanent support a layer of cellulose ethyl ether incompatible with the temporary support, said last-mentioned layer being strippable from said temporary support.

GALE F. NADEAU.
CLEMENS B. STARCK.